United States Patent
Park et al.

(10) Patent No.: US 9,733,876 B2
(45) Date of Patent: Aug. 15, 2017

(54) METHOD OF PRINTING WEB PAGE BY USING MOBILE TERMINAL AND MOBILE TERMINAL FOR PERFORMING THE METHOD

(71) Applicant: Samsung Electronics Co., Ltd., Suwon-si, Gyeonggi-do (KR)

(72) Inventors: Jeong-jin Park, Seongnam-si (KR); Dong-chae Park, Suwon-si (KR); Jae-wook Cho, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/292,239

(22) Filed: May 30, 2014

(65) Prior Publication Data

US 2014/0368868 A1    Dec. 18, 2014

Related U.S. Application Data

(60) Provisional application No. 61/834,150, filed on Jun. 12, 2013.

(30) Foreign Application Priority Data

Jul. 12, 2013    (KR) .......................... 10-2013-0082471

(51) Int. Cl.
G06F 3/12    (2006.01)

(52) U.S. Cl.
CPC ............ *G06F 3/125* (2013.01); *G06F 3/1208* (2013.01); *G06F 3/1244* (2013.01); *G06F 3/1256* (2013.01); *G06F 3/1292* (2013.01); *G06F 3/1219* (2013.01)

(58) Field of Classification Search
CPC ...... G06F 3/1208; G06F 3/125; G06F 3/1256; G06F 3/1292
USPC ................................ 358/1.1–1.9, 1.11–1.18
See application file for complete search history.

(56) References Cited

U.S. PATENT DOCUMENTS

| 6,918,039 | B1 | 7/2005 | Hind et al. |
| 7,345,688 | B2 * | 3/2008 | Baudisch et al. ............. 345/467 |
| 8,326,662 | B1 * | 12/2012 | Byrne et al. ................. 705/7.11 |
| 2005/0114788 | A1 | 5/2005 | Fabritius |
| 2008/0238971 | A1 * | 10/2008 | Cook ......................... B41J 3/36 347/14 |
| 2009/0304300 | A1 * | 12/2009 | Minobe ......................... 382/254 |
| 2010/0022275 | A1 * | 1/2010 | Shu ............................... 455/566 |

(Continued)

FOREIGN PATENT DOCUMENTS

| KR | 10-2010-0117156 | 11/2010 |
| WO | WO2013059958 | 5/2013 |

OTHER PUBLICATIONS

Office Action mailed Sep. 26, 2014 in related U.S. Appl. No. 14/292,243.

(Continued)

*Primary Examiner* — Ibrahim Siddo
(74) *Attorney, Agent, or Firm* — Staas & Halsey LLP

(57) ABSTRACT

A method of printing a web page by using a mobile terminal and a mobile terminal are provided. The method includes displaying the web page on the mobile terminal, extracting objects that are to be printed from the web page displayed on the mobile terminal, setting a layout of the extracted objects, and generating printing data by rendering the objects according to the layout.

20 Claims, 16 Drawing Sheets

(56) References Cited

U.S. PATENT DOCUMENTS

| | | | |
|---|---|---|---|
| 2010/0023863 A1* | 1/2010 | Cohen-Martin | G06Q 30/02 |
| | | | 715/723 |
| 2010/0031169 A1* | 2/2010 | Jang et al. | 715/760 |
| 2010/0064018 A1* | 3/2010 | Luo | G06F 17/30905 |
| | | | 709/206 |
| 2010/0075234 A1* | 3/2010 | Cousins | 430/5 |
| 2010/0083144 A1* | 4/2010 | Baxley et al. | 715/760 |
| 2010/0088605 A1* | 4/2010 | Livshin | G06F 17/212 |
| | | | 715/731 |
| 2011/0032183 A1 | 2/2011 | Murphey | |
| 2011/0157621 A1* | 6/2011 | Fu | G06F 3/1206 |
| | | | 358/1.15 |
| 2011/0221766 A1* | 9/2011 | Ko et al. | 345/629 |
| 2012/0054597 A1* | 3/2012 | Yamada | G06T 11/60 |
| | | | 715/234 |
| 2012/0303636 A1* | 11/2012 | Luo et al. | 707/748 |
| 2014/0293320 A1 | 10/2014 | Williams et al. | |

OTHER PUBLICATIONS

U.S. Office Action dated Sep. 18, 2015 in copending U.S. Appl. No. 14/292,243.
Office Action mailed Apr. 4, 2016 in copending U.S. Appl. No. 14/292,243.
U.S. Final Office Action mailed Apr. 2, 2015 in co-pending U.S. Appl. No. 14/292,243.
U.S. Appl. No. 14/292,243, filed May 30, 2014, Jeong-jin Park et al., Samsung Electronics Co., Ltd.

* cited by examiner

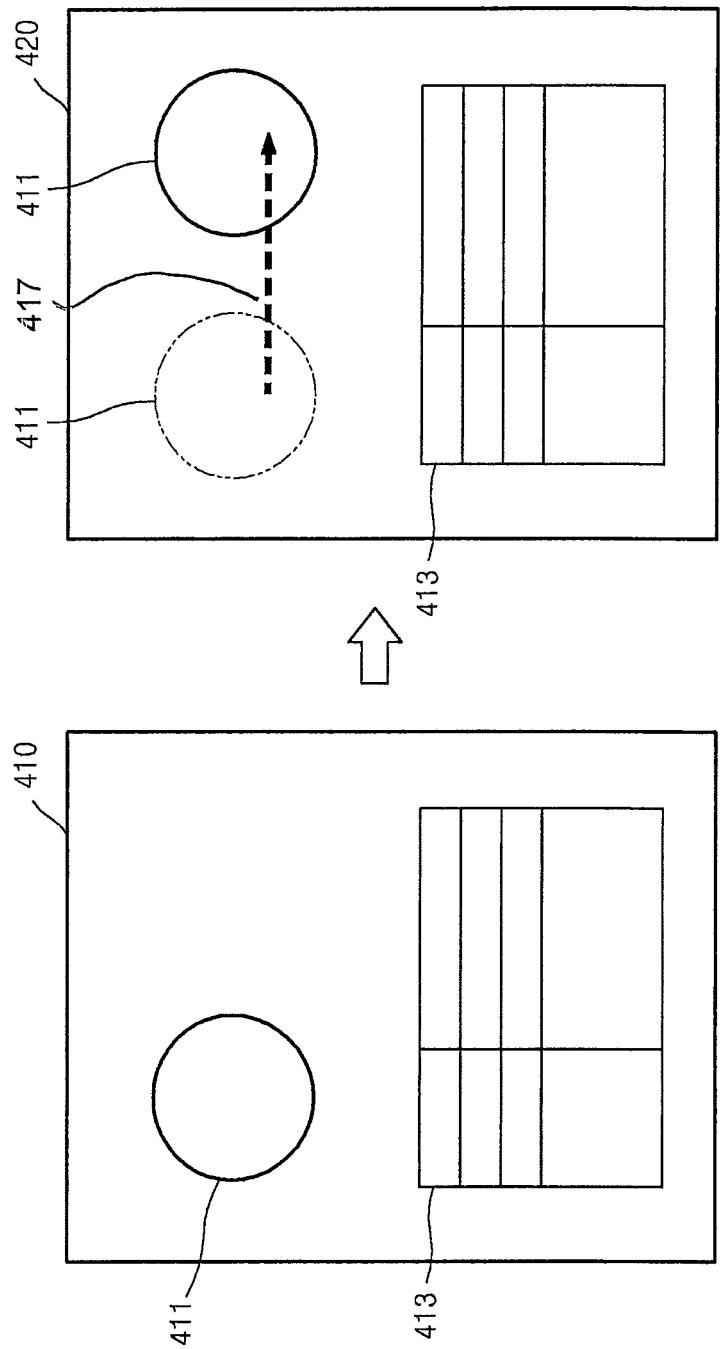

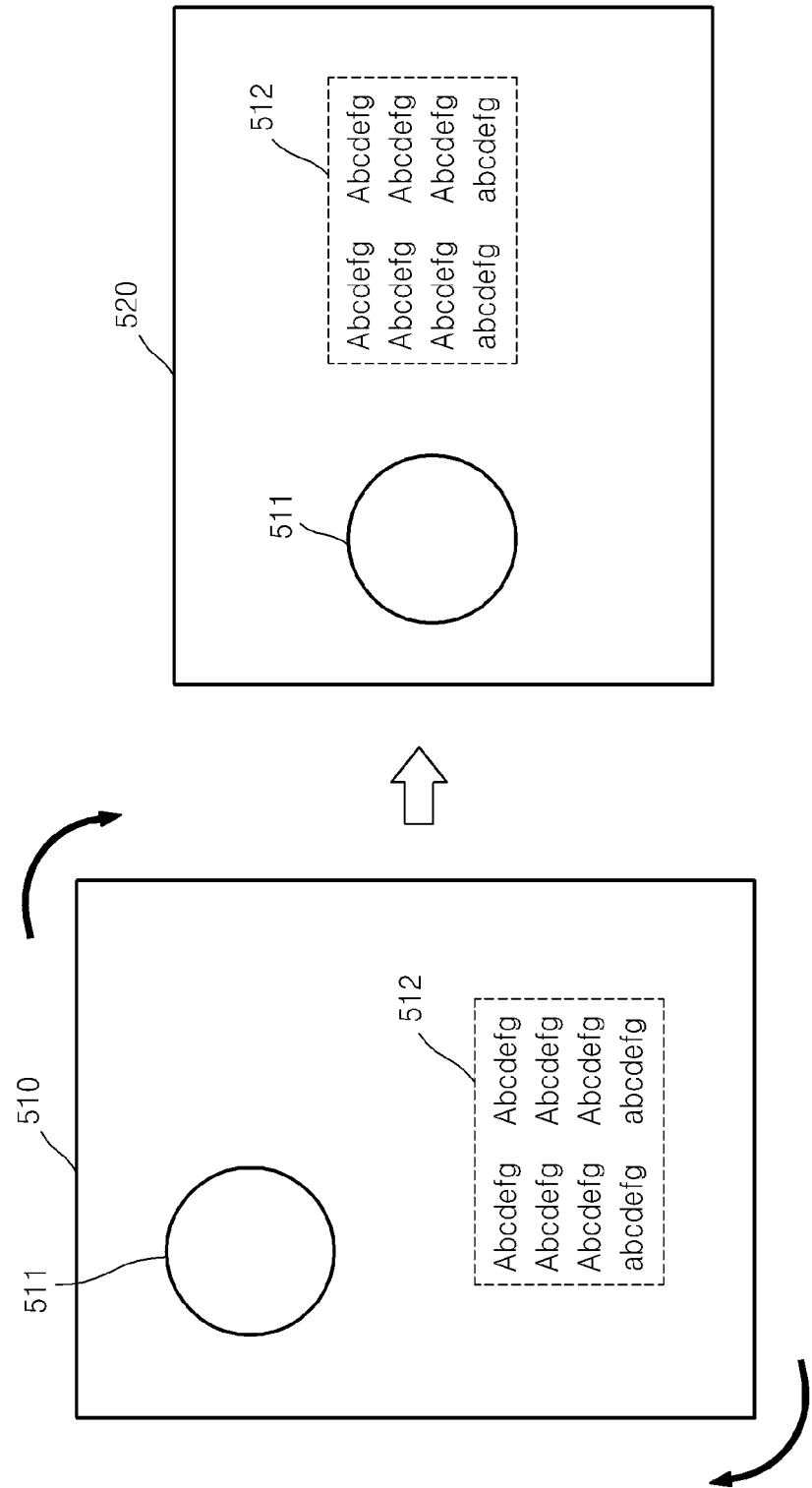

METHOD OF PRINTING WEB PAGE BY USING MOBILE TERMINAL AND MOBILE TERMINAL FOR PERFORMING THE METHOD

CROSS-REFERENCE TO RELATED APPLICATIONS

This application is related to, and claims the priority benefit of, U.S. Provisional Patent Application No. 61/834,150, filed on Jun. 12, 2013, in the U.S. Patent and Trademark Office, and Korean Patent Application No. 10-2013-0082471, filed on Jul. 12, 2013, in the Korean Intellectual Property Office, the disclosures of which are incorporated herein in their entirety.

BACKGROUND

1. Field

One or more embodiments relate to a method of printing a web page by using a mobile terminal, and a mobile terminal.

2. Description of the Related Art

Recently, mobile terminals such as smartphones or tablet PCs have been widely used, and Internet searching has been performed by using the mobile terminals. In some cases, current web page displayed on the smartphone may need to be printed. Printing data may be generated by using a mobile printing application installed in the smartphone, and the printing data may be transferred wirelessly to a printer to perform a direct printing operation.

When generating the printing data by using the mobile printing application, the currently displayed web page screen may be converted into a bitmap image by using a Web view component provided by an operating system (OS) thereof to generate the printing data. However, problems may exist with same.

Printing quality may be low. Since a web view screen may be captured as it is or converted into a bitmap image, the bitmap image may be generated with a resolution that is merely suitable for a smartphone screen, and accordingly, the printing quality of the bitmap image may be degraded. The Web view may have to be expanded and captured a plurality of times in order to print the web view of high quality, and thus, it may require a lot of time for printing. In addition, in some OS, the method may not be performed, and thus, the printing may be performed in low quality.

In addition, a rendering efficiency may be degraded. When performing a rendering operation, images are captured from the web view and recombined to configure a printing image per page, and then, the printing data is generated. Thus, it may require a lot of time for performing the rendering operation, and storage space in a memory may not be sufficient.

Also, changing a layout may be difficult. Since the web page is captured and extracted as the bitmap image, if a user changes printing options and a layout is changed, the entire web page has to be recombined. Thus, operation processes may be complicated and require a lot of time for performing the operation.

In addition, the printing method may be highly dependent upon a kind of OS. If the web view does not support the image extraction according to the kind of OS, it may be difficult to use the web page printing function in the smartphone. Since manipulation method of the web view component varies depending on the OS, a coding operation may need to be performed again according to each OS.

SUMMARY

One or more embodiments include a method of printing web page displayed on a mobile terminal, capable of performing a printing operation of high quality and high efficiency, easily setting and changing a layout, and forming a common module between different kinds of platforms.

Additional aspects will be set forth in part in the description which follows and, in part, will be apparent from the description, or may be learned by practice of the embodiments.

According to one or more embodiments, a method of printing a web page by using a mobile terminal includes displaying the web page on the mobile terminal, extracting objects that are to be printed from the web page displayed on the mobile terminal, setting a layout of the extracted objects, and generating printing data by rendering the objects according to the layout.

The extracting of the objects may include obtaining web page sources by analyzing the web page, and extracting attribute-values of the objects and values about relative locations between the objects from the web page sources.

The setting of the layout may include adjusting sizes and locations of the objects by changing the attribute-values of the objects and the values about the relative locations between the objects.

The generating of the printing data may include mapping and converting the attribute-values of the objects and the values about the relative locations between the objects as a command corresponding to a format of the printing data that is to be generated.

According to one or more embodiments, a mobile terminal includes a user interface to receive a user input, a communication unit to receive a web page, a display unit to display the web page; a printing data generator to generate printing data about the web page displayed on the display unit, and a control unit, wherein the printing data generator generates the printing data by configuring items of the web page displayed on the display unit as objects.

The printing data generator may include an object extractor to extract objects to be printed from the web page displayed on the display unit, a layout setting unit to set a layout of the objects, and a rendering unit to perform a rendering operation according to the layout to generate the printing data.

The object extractor may extract attribute-values of the objects and values about relative locations between the objects from web page sources obtained by analyzing the web page displayed on the display unit.

The layout setting unit may adjust sizes and locations of the objects by changing the attribute-values of the objects and the values about the relative locations between the objects.

The rendering unit may map and convert the attribute-values of the objects and the values about the relative locations between the objects as a command corresponding to a format of the printing data that is to be generated.

BRIEF DESCRIPTION OF THE DRAWINGS

These and/or other aspects will become apparent and more readily appreciated from the following description of the embodiments, taken in conjunction with the accompanying drawings of which:

FIG. 4 illustrates a screen of changing a location of the object according to the method of printing the web page by using the mobile terminal of an embodiment;

FIGS. 5A and 5B illustrate screens of changing layout of objects according to an orientation change of a mobile terminal in a method of printing a web page by using the mobile terminal, according to an embodiment;

DETAILED DESCRIPTION

Figure 1:
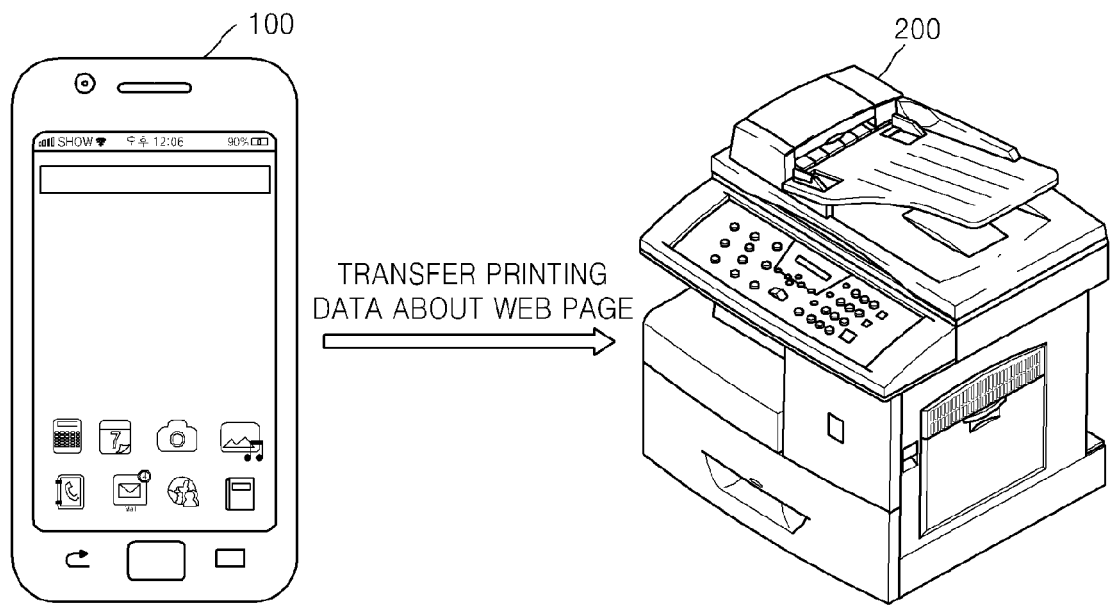
FIG. 1 illustrates an environment for implementing a method of printing a web page by using a mobile terminal, according to an embodiment.

Reference will now be made in detail to embodiments, examples of which are illustrated in the accompanying drawings, wherein like reference numerals refer to the like elements throughout. In this regard, the embodiments may have different forms and should not be construed as being limited to the descriptions set forth herein. Accordingly, the embodiments are described below, by referring to the figures, to explain aspects of the present description.

FIG. 1 illustrates an environment of implementing a method of printing a web page by using a mobile terminal 100 according to an embodiment. To execute a method of printing the Web page by using the mobile terminal 100, a mobile terminal 100 displaying a Web page and generating printing data of the Web page, and a multi-functional peripheral (MFP) 200 receiving the printing data from the mobile terminal 100 and performing a printing operation may be used. A method of printing a web page by using a mobile terminal according to an embodiment is described.

The method of printing the web page by using the mobile terminal according to an embodiment includes extracting objects from a web page, setting a layout of extracted objects, generating printing data by rendering the objects according to the set layout, and parsing the printing data to perform a printing operation. Processes are described with reference to FIGS. 2 through 7. Screens illustrated in FIGS. 2 through 7 are preview images of the Web page to be printed.

Figure 2:
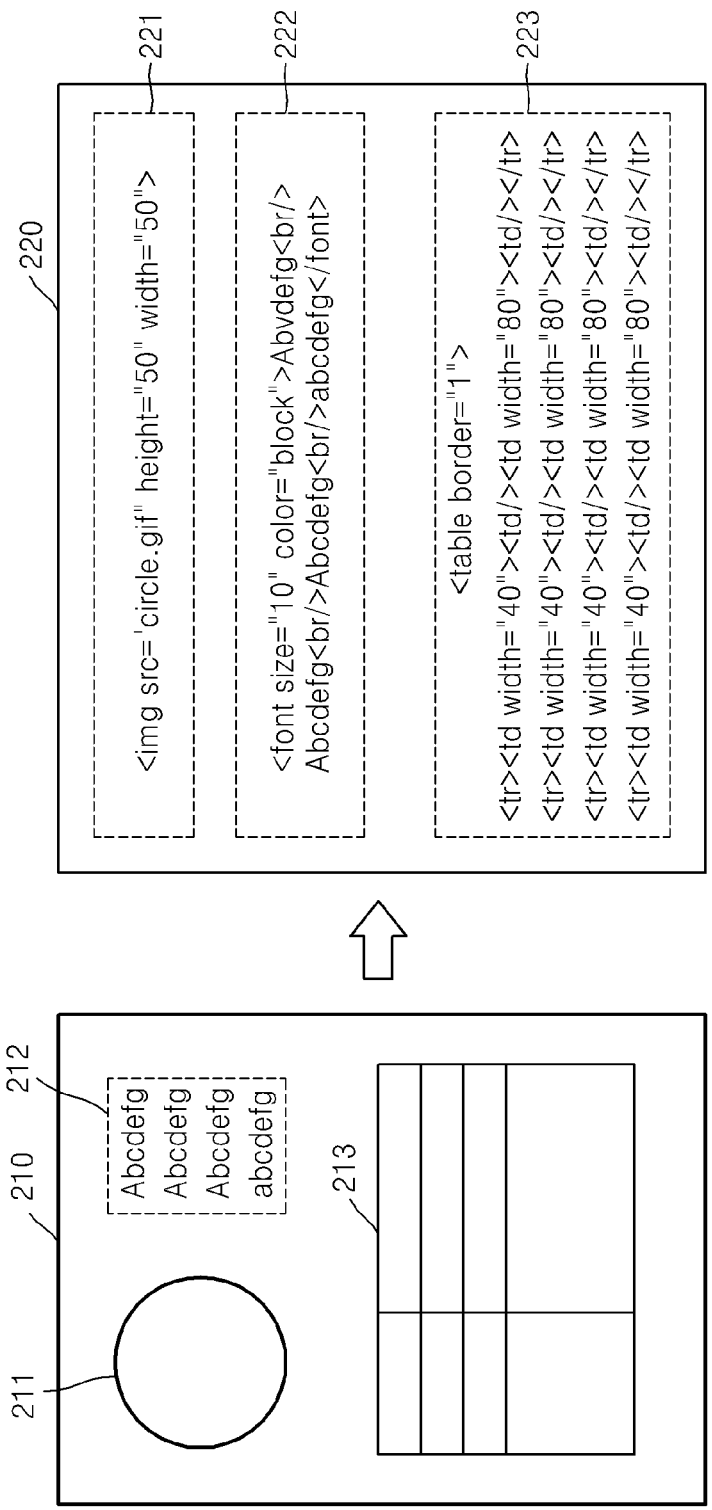
FIG. 2 illustrates a screen of web page sources by analyzing a web page according to a method of printing the web page by using a mobile terminal according to an embodiment.
Figure 3A:
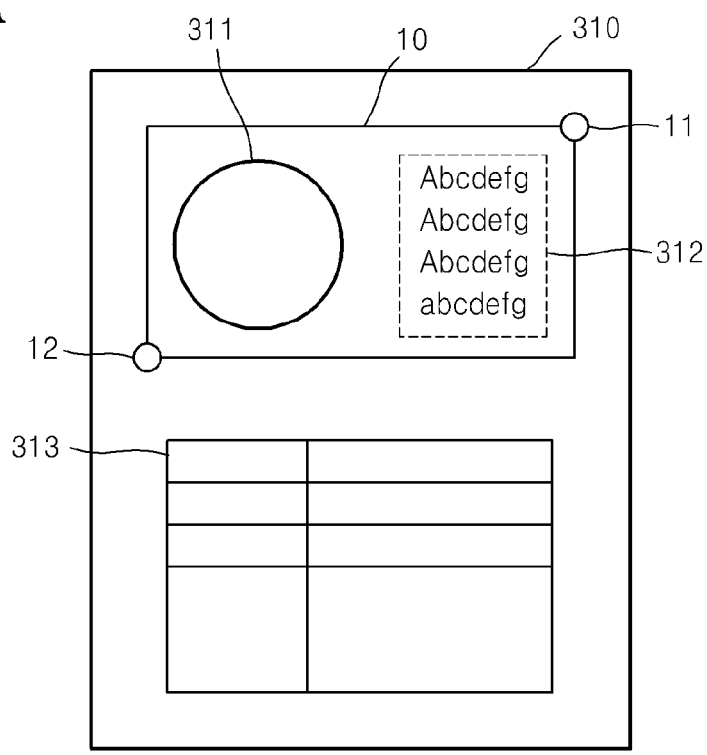
FIGS. 3A and 3B illustrate a screen of selecting an object to be printed in the method of printing the web page by using the mobile terminal according to an embodiment.
Figure 3B:
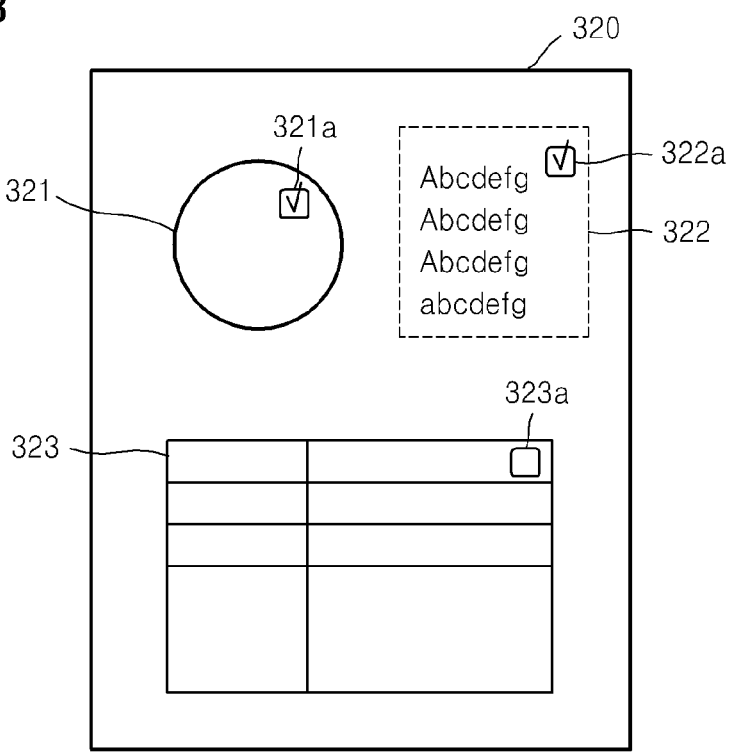

FIGS. 2 through 3B are diagrams relating to the operation of extracting objects from a Web page.

FIG. 2 illustrates a screen of obtaining web page sources by analyzing a web page 210. The web page 210 may be generally configured by hypertext mark-up language (HTML) or Java-script, and web page source 220 may be obtained by analyzing the web page 210. The web page source 220 includes attribute-values 221, 222, and 223 corresponding respectively to objects 211, 212, and 213 included in the web page 210, and values about relative locations between the objects. An attribute-value of an object is a value including information, for example, about a style, a size, a color, and/or an interval of the object. By extracting the attribute-values 221, 222, and 223 and the value about the relative locations between the object from the web page source 220, elements included in the web page 210 may be managed as objects.

Configurations of the web page source 220, which are not displayed on the web page 210, for example, sound, events, background logic, and the like) may be removed, and the attribute-values only about an image object 211, a text object 212, and a table object 213 that are displayed on the web page 210 may be extracted to simplify the web page source 220.

After extracting the objects 211, 212, and 213 displayed on the web page 210, objects to be printed may be extracted, except for some of the objects, according to a user's selection.

FIGS. 3A and 3B illustrate screens of selecting the objects to be printed according to a method of printing the web page by using the mobile terminal of an embodiment. A mobile printing application may provide a preview image including some or all the objects included in the web page, and provide a screen through which the user may directly select the objects to be printed. FIGS. 3A and 3B illustrate examples of such screen.

As illustrated in FIG. 3A, a region may be set in order to select objects to be printed from among objects 311, 312, and 313 on a web page 310. The objects 311 and 312 located in a selected region 10 may be selected as the objects to be printed and extracted. The object 313 located out of the selected region 10 is not printed and may be deleted.

A size of the selected region 10 may be set by moving two setting points 11 and 12 located at corners of the selected region 10, or a location of the selected region 10 itself may be moved. For example, in a case where the web page 310 is displayed on a touch screen, the user may touch a setting point, e.g., the two setting points 11 and 12 with two fingers and move the fingers to move the setting points 11 and 12. The setting region 10 having the setting points 11 and 12 that are moved as corners may be newly set. When the user may touch a finger on an arbitrary point in the selected region 10 and move the finger while contacting the touch screen, the entire selected region 10 may be moved along the finger.

When the objects to be printed are selected by setting the selected region 10, the plurality of objects may be easily selected.

As illustrated in FIG. 3B, objects 321, 322, and 323 displayed on the web page 320 may have check boxes 321a, 322a, and 323a, respectively. The screen showing the check boxes 321a, 322a, and 323a may be displayed, for example, outlined or highlighted, where the user may select objects to be displayed. For example, when the user touches one of the objects 321, 322, and 323 for a predetermined time period or longer, the check boxes 321a, 322a, and 323a are displayed to await a selection input of the user. A selection may be realized in various ways.

The user may select the object by touching the check box on the object to be printed. In FIG. 3B, the check box 321a on the image object 321 and the check box 322a on the text object 322 are checked, and thus, the image object 321 and the text object 322 are selected as the objects to be printed. Therefore, the image object 321 and the text object 322 are extracted, and a table object 323 is deleted.

Figure 5B:
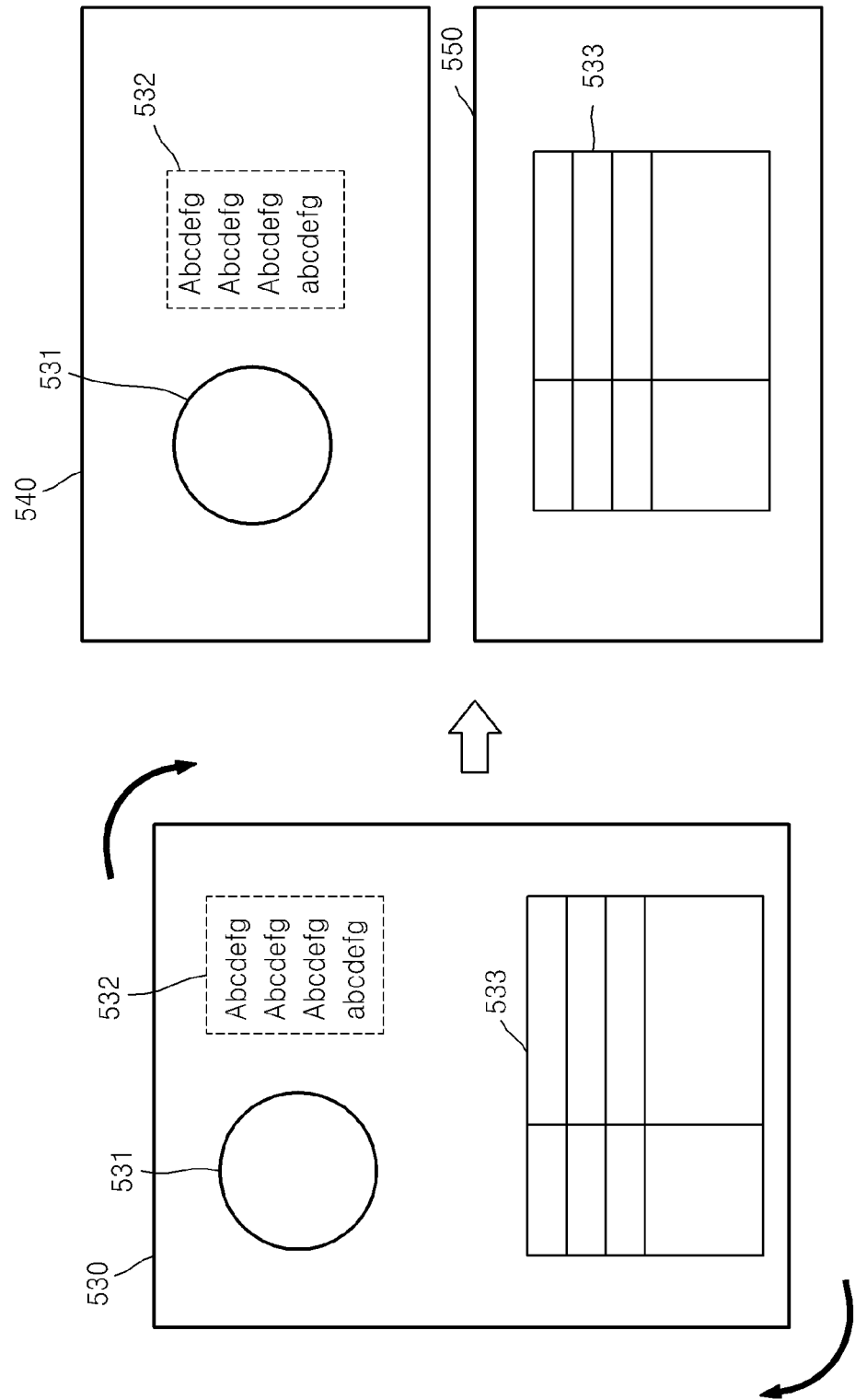

When the objects to be printed are extracted, a layout of the extracted objects may be set. FIGS. 4 through 5B illustrate a setting of the layout of the extracted objects.

When the user sets printing options, the layout of the objects may be set automatically according to the set printing options. For example, when the user sets the printing options such as a size of a printing paper and a printing direction, sizes of the objects are increased or reduced according to the set printing option, and locations of the objects are determined. Such an automatic layout setting function may be turned on or turned off by the user in a set menu of a mobile printing application.

After setting the layout automatically, if there is an input of changing the layout setting from the user, the layout of the objects may be changed. The user may direct the change in the layout setting in various ways. A method of changing a location of an object directly by using a touch operation and a method of changing a direction of a mobile terminal on which a web page is displayed are described with reference to FIGS. 4 through 5B.

FIG. 4 illustrates a screen changing a location of an object in a method of printing a web page by using a mobile terminal according to an embodiment. As illustrated in FIG. 4, an image object 411 and a table object 413 are on a web page 410, e.g., at a left side of web page 410. When the user touches an arbitrary point on the image object 411 and moves a finger in a direction denoted by an arrow 417 while contacting the screen, the image object 411 may be moved along with the finger, as illustrated on a web page 420 to a right side of web page 420. The table object 413 may be easily moved in a similar manner.

FIGS. 5A and 5B illustrate screens and a changing of the layout of the objects according to a change in orientation, for example, of a mobile terminal in a method of printing a web page by using a mobile terminal according to an embodiment.

As illustrated in FIG. 5A, a web page 510 displays a layout setting of objects 511 and 512 when the mobile terminal is placed in a longitudinal direction. When the mobile terminal is placed in the longitudinal direction, a longitudinal length of the web page 510 is greater than a transverse width of the web page 510, and thus, the image object 511 and the text object 512 are located above and below each other. In this state, when the direction in which the mobile terminal is placed is changed to a transverse direction, the layout of the objects 511 and 512 is changed as illustrated in a web page 520. In a state where the mobile terminal is placed in the transverse direction, since the transverse width of the web page 520 is greater than the longitudinal length of the web page 520, the image object 511 and the text object 512 are arranged on left and right sides of the web page 520.

The objects that may be displayed in one web page may be displayed on two or more separate web pages due to the orientation change of the mobile terminal as illustrated in FIG. 5B. As illustrated in FIG. 5B, an image object 531, a text object 532, and a table object 533 are displayed on one web page 530 in a state where the mobile terminal is placed in a longitudinal direction. However, when the direction in which the mobile terminal is placed is changed to the transverse direction, the objects 531, 532, and 533 are separately displayed on two web pages 540 and 550. The web pages 540 and 550 may or may not be displayed on the screen of the mobile terminal at once. For example, only one web page may be displayed, and another web page may be displayed when a touch input such as a flicking of the screen of the mobile terminal is input.

It may be determined whether the mobile terminal is placed in the longitudinal direction or the transverse direction by using, for example, a gyro sensor provided in the mobile terminal. When the user holds the mobile terminal longitudinally or transversely, an orientation of the mobile terminal may be determined by detecting a sensing value of a gyro sensor in the mobile terminal, and the layout of the objects may be automatically changed according to the determined orientation. Therefore, the user may change the printing type and the layout of the objects easily by changing the orientation of the mobile terminal.

Figure 6:
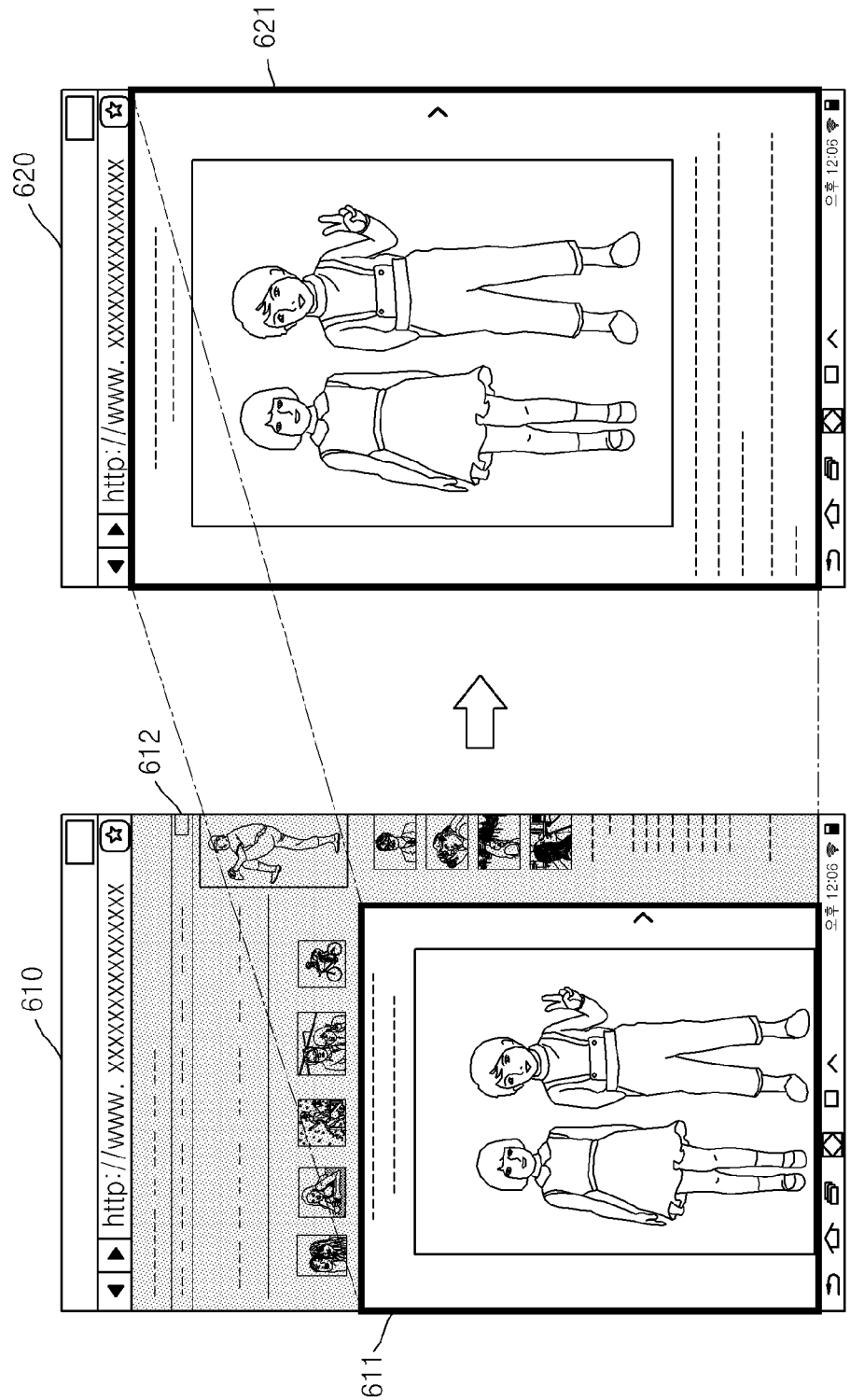
FIG. 6 illustrates a screen of selecting an object to be printed in a method of printing the web page by using a mobile terminal according to an embodiment.

FIG. 6 illustrates a screen of selecting an object to be printed in the method of printing the web page by using the mobile terminal, according to an embodiment. As illustrated in FIGS. 3A and 3B, the user may directly select the object to be printed, however, the object to be printed may be selected automatically even when the user may not select the object directly. In FIG. 6, a web page 610 is a screen showing a certain article on a portal site. The web page 610 includes a content portion 611 of the article and a portion 612 including, for example, ads and image links. According to an embodiment, only the content portion 611 of the article may be desired to be printed, and thus, when there is a request for printing, objects included in the content portion 611 of the article may be extracted and expanded to provide a preview image, as illustrated in a web page 620 at a right side of FIG. 6.

The objects to be printed may be automatically selected and extracted according to a characteristic of the web page, and thus, inconvenience of selecting the objects may be reduced.

When the layout setting of the objects is finished, a rendering operation may be performed to generate printing data. There are multiple ways of rendering objects that are extracted according to the set layout, one of which is a rendering performed based on objects and another of which is a method of generating bitmap image data.

According to a method of performing the rendering operation based on the objects, attribute-values of the extracted objects and values about relative locations between the objects are mapped to a command corresponding to a format of the printing data that is to be generated and converted into the printing data, as illustrated in FIG. 2. For example, if the objects are rendered as a printer control language (PCL) file or a portable document format (PDF) file, the extracted objects are mapped as PCL and PDF command and converted. The rendering may be performed in an XML paper specification (XPS) or a post script (PS) format file.

Figure 7:
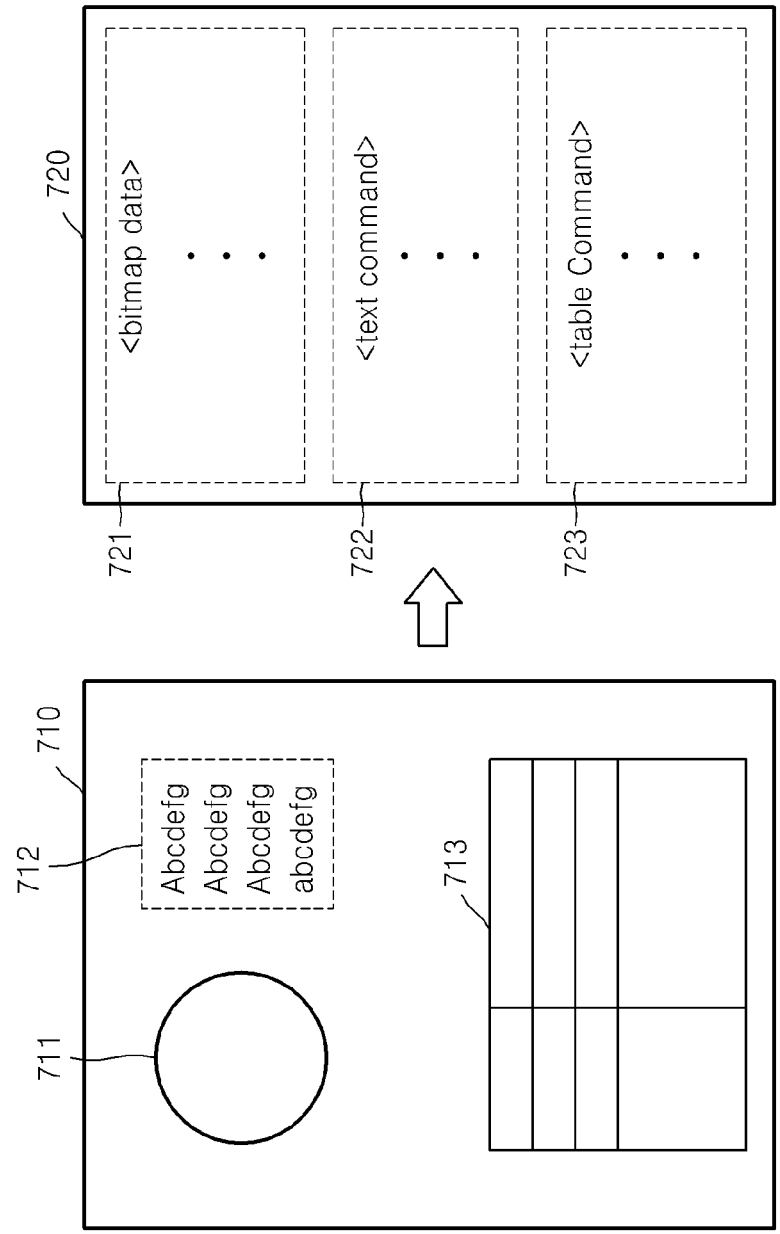
FIG. 7 illustrates a screen of performing an object-based rendering operation in a method of printing the web page by using the mobile terminal, according to an embodiment.

FIG. 7 illustrates a screen in performing an object-based rendering operation in the method of printing the web page by using a mobile terminal according to an embodiment. Objects 711, 712, and 713 illustrated on a web page 710 at a left side of FIG. 7 may be mapped as corresponding commands, as illustrated in a web page 720 at a right side of FIG. 7. That is, an image object 711 is mapped as bitmap data 721, and a text object 712 and a table object 713 are mapped respectively as a text command 722 and a table command 723.

According to the method of generating the bitmap data, the objects are arranged after being expanded or reduced according to the set layout, and the bitmap images are generated according to pixel values.

The printing data generated may be transferred to a multi-function peripheral (MFP). The MFP performs a printing operation by parsing the printing data. Processes of printing the printing data by the MFP are described with reference to FIG. 9.

Figure 8:
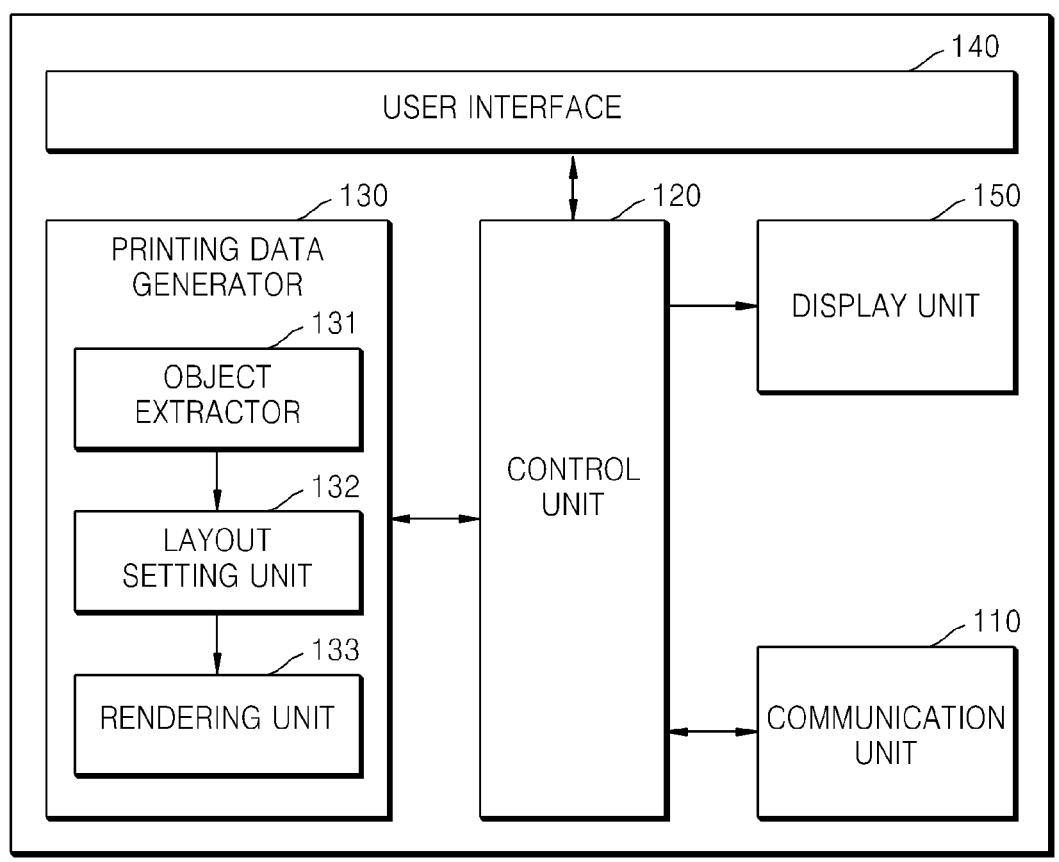
FIG. 8 is a block diagram of a mobile terminal according to an embodiment.
Figure 9:
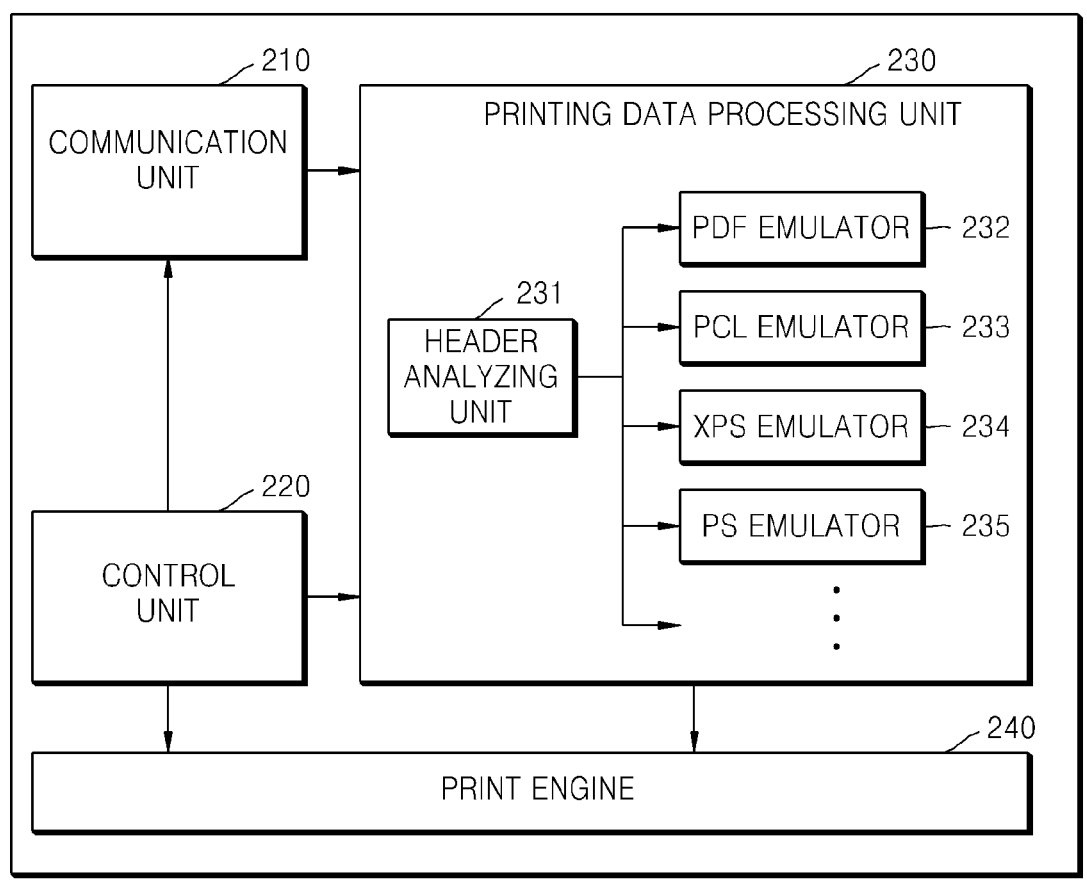
FIG. 9 is a block diagram of an image forming apparatus according to an embodiment.

Configurations of the mobile terminal and the MFP for performing the method of printing the web page are described. FIG. 8 is a block diagram of a mobile terminal 100 according to an embodiment, and FIG. 9 is a block diagram of an MFP 200 according to an embodiment.

As illustrated in FIG. 8, the mobile terminal 100 according to an embodiment includes a communication unit 110, a control unit 120, a printing data generator 130, a user interface 140, and a display unit 150. The printing data generator 130 may include an object extractor 131, a layout setting unit 132, and a rendering unit 133.

The communication unit 110 is a component for performing wired/wireless communication. The mobile terminal 100 may access the Internet via the communication unit 110 to receive web pages, and may transmit the printing data to the MFP via the communication unit 110.

The control unit 120 controls an execution of a mobile printing application installed in the mobile terminal 100, and controls other components, for example, all the other components included in the mobile terminal 100. The control unit 120 may control the display unit 150 to display the web page received via the communication unit 110, and may control the printing data generator 130 to generate printing data of the web page displayed on the display unit 150. The control unit 120 controls operations of the mobile terminal in response to a user input received through the user interface 140. For example, when receiving a printing option setting input from the user, the control unit 120 sets the printing option, and when receiving a printing command, the control unit 120 makes the printing data generate and transferred to the MFP. The control unit 120 may include a micro processor.

The user interface 140 receives various inputs from the user, and the display unit 150 displays the images. In an embodiment, the user interface 140 and the display unit 150 are separate elements; however, the user interface 140 and the display unit 150 may be configured as one element. For example, a touch screen that may display the image and receive various inputs from the user may be both the user interface 140 and the display unit 150.

The printing data generator 130 generates the printing data for printing the web page displayed on the display unit 150. The printing data generator 130 generates the printing data of high quality and with high efficiency by making the features of the web page as objects, and it is easy to change the layout of the objects and to form a common module between two different kinds of platforms.

Detailed operations of the components included in the printing data generator 130 are described. The object extractor 131 extracts the objects to be printed from the web page. The web page formed as HTML or Java-script may be analyzed to obtain web page sources, and attribute-values of the objects and values about relative locations between the objects are extracted from the web page sources. Items that are not displayed on the web page from among the items included in the web page sources (for example, sound, events, background logic, and the like) may be deleted, attribute-values of the objects that are displayed, for example, only the objects that are displayed, on the web page, that is, an image object, a text object, and a table object, may be extracted.

The objects to be printed may be selected by the user or automatically according to the characteristic of the web page from among the objects displayed on the web page, for example, as described above with reference to FIGS. 3A, 3B, and 6.

The layout setting unit 132 sets the layout of the objects extracted by the object extractor 131. When the user sets the printing options, the layout setting unit 132 may set the layout of the objects automatically according to the printing options. For example, when the user sets printing options such as a size of the printing medium and a printing direction, the layout setting unit 132 may expand or reduce the sizes of the objects, and determine the locations of the objects.

When receiving a user input for changing the layout setting through the user interface 140 after setting the layout automatically, the layout setting unit 132 changes the layout of the objects. A method of changing the layout according to the user input is described above, for example, with reference to FIGS. 4 through 5B.

The rendering unit 133 performs the rendering operation according to the layout set by the layout setting unit 132 for finally forming the printing data. There are multiple ways of rendering the objects according to the layout, one of which is a method of performing the rendering operation based on the objects and another of which is a method of generating bitmap image data.

According to a method of performing the object-based rendering operation, the rendering unit 133 maps the attribute-values of the objects extracted from the web page sources and the values about the relative locations between the objects as the command corresponding to a format of the printing data that is to be generated. For example, the rendering unit 133 may generate printing data of PCL format by mapping and converting the extracted objects to the PCL command, and similarly, may generate printing data of the PDF, XPS, or PS format.

According to a method of generating the bitmap image data, the rendering unit 133 arranges the objects by expanding or reducing the objects according to the layout, and generates the bitmap image by reading the pixel values of the objects.

As illustrated in FIG. 9, the MFP 200 according to an embodiment may include a communication unit 210, a control unit 220, a printing data processing unit 230, and a print engine 240. The printing data processing unit 230 may include a header analyzing unit 231, and emulators 232 through 235 corresponding to a plurality of file formats.

The communication unit 210 is a component for wirelessly communicating with the mobile terminal 100. The MFP 200 may receive printing data for printing the web page from the mobile terminal 100 via the communication unit 210.

The control unit 220 controls operations of components in the MFP 200. When the communication unit 210 receives the printing data, the control unit 220 controls the MFP 200 to transfer the printing data to the printing data processing unit 230 for performing a parsing operation and to print the parsed printing data by the print engine 240. The control unit 220 may include a micro processor.

The printing data processing unit 230 processes the printing data transmitted from the mobile terminal 100. The header analyzing unit 231 analyzes a header of the received printing data to determine a file format of the printing data, and sends the printing data to an emulator corresponding to the determined file format. That is, when it is determined that the file format of the printing data is a PDF format, the header analyzing unit 231 transfers the printing data to a PDF emulator 232, and transfers the printing data to the corresponding emulator.

The emulator corresponding to each file format converts the printing data into a bitmap image, and transfers the bitmap image to the print engine 240. In FIG. 9, the emulators 232 through 235 include the PDF emulator 232, a PCL emulator 233, an XPS emulator 234, and a PS emulator 235, however, additional emulators corresponding to additional file formats may be further provided, if necessary.

FIGS. 10 through 20 are flowcharts illustrating a method of printing a web page by using a mobile terminal according to an embodiment. A method of printing the web page by using the mobile terminal is described with reference to FIGS. 10 through 20.

Figure 10:
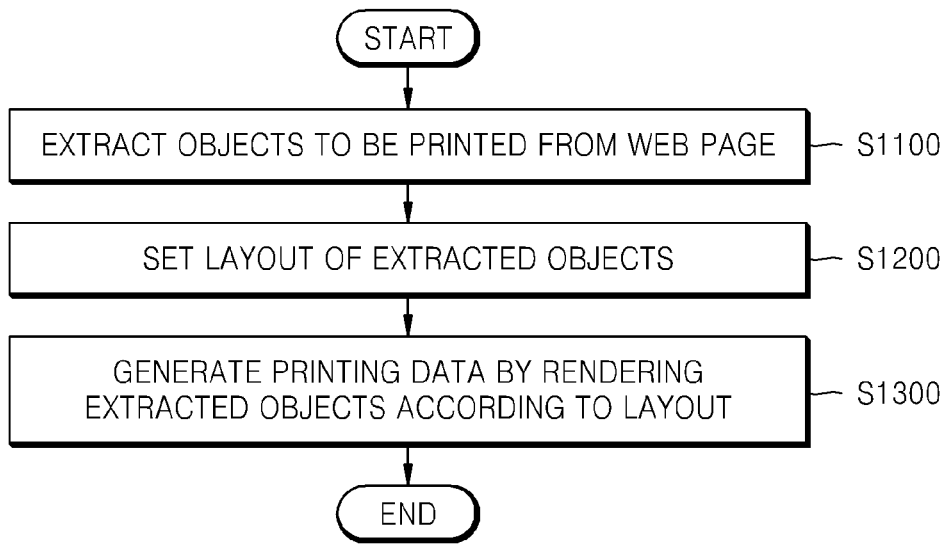
FIG. 10 is a flowchart illustrating a method of printing a web page by using a mobile terminal according to an embodiment.

FIG. 10 is a flowchart illustrating a method of printing a web page by using a mobile terminal according to an embodiment. As illustrated in FIG. 10, objects to be printed are extracted from a web page in operation S1100. When the objects to be printed are extracted, a layout of the extracted objects is set in operation S1200. The extracted objects are rendered according to the layout to generate printing data in operation S1300. A preview image in which the objects extracted in operation S1100 are arranged according to the layout set in the operation S1200 may be generated and provided to the user. Selection of the objects to be printed or an input of changing the layout may be received through the preview image.

The processes of extracting the objects, setting the layout, and rendering the objects are described in detail with reference to FIGS. 11 through 16.

Figure 11:
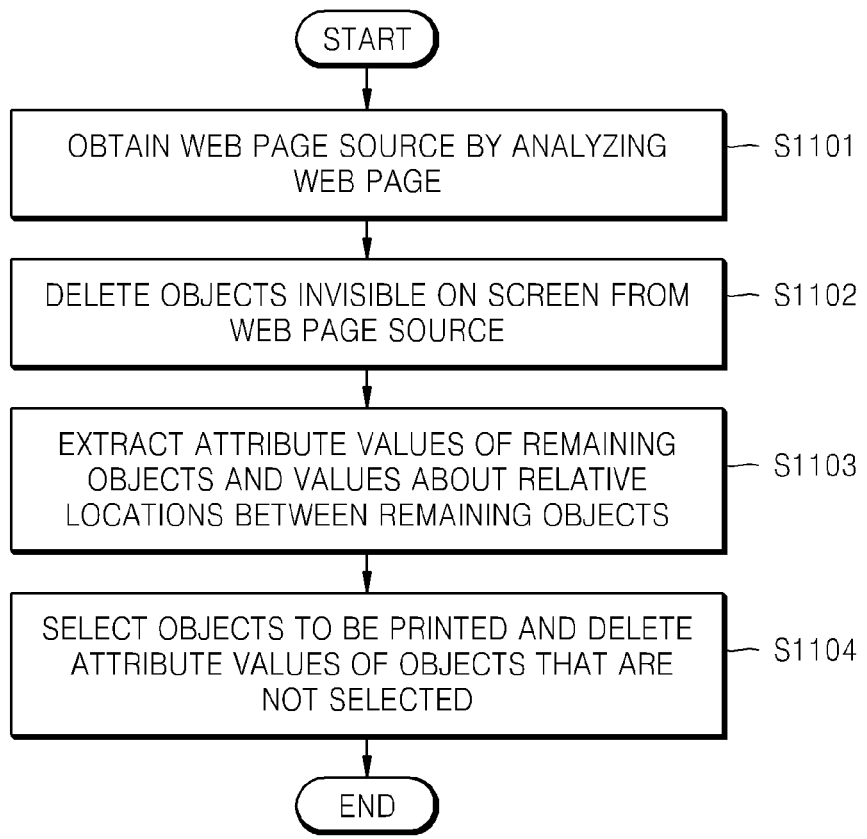
FIG. 11 is a flowchart illustrating processes of extracting an object in a method of printing a web page by using a mobile terminal according to an embodiment.

FIG. 11 is a flowchart illustrating processes of extracting the objects, according to an embodiment. That is, FIG. 11 illustrates processes included in the operation S1100 in detail.

As illustrated in FIG. 11, the web page configured as the HTML or the Java-script is analyzed to obtain web page sources in operation S1101. The web page sources include attribute-values of the objects, which correspond to the objects included in the web page, and values about relative locations between the objects. The attribute-value of the object includes information about a style, a size, a color, and an interval of the object.

Items that are not displayed on the web page (for example, sound, events, background logic, and the like) from among items included in the web page sources are deleted in operation S1102. Attribute-values and values about relative locations between the remaining objects, that is, the objects displayed on the web page, are extracted in operation S1103.

Objects to be printed are selected by the user or according to characteristics of the web page in operation S1104, and the attribute-values of the objects that are not selected are deleted.

Figure 12:
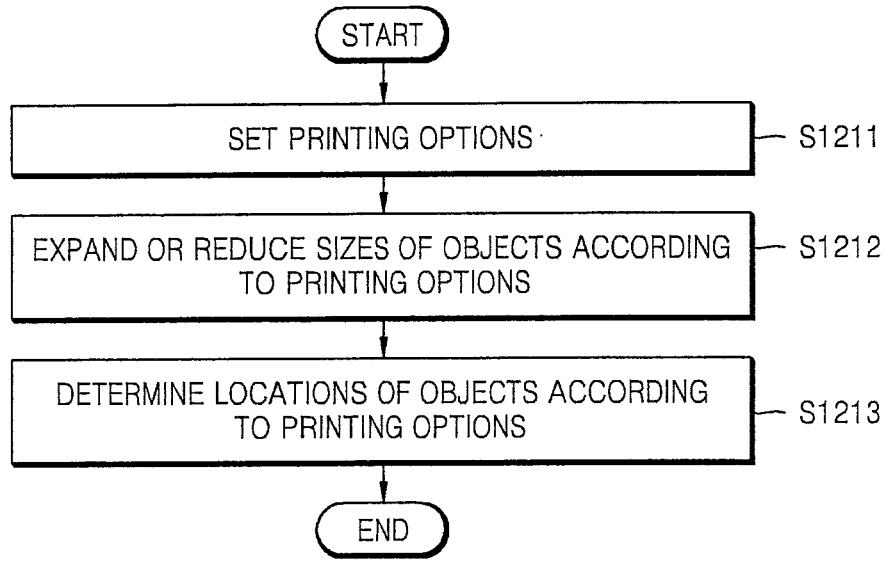
FIGS. 12 through 14 are flowcharts illustrating processes of setting layouts of objects in a method of printing a web page by using a mobile terminal according to an embodiment.
Figure 13:
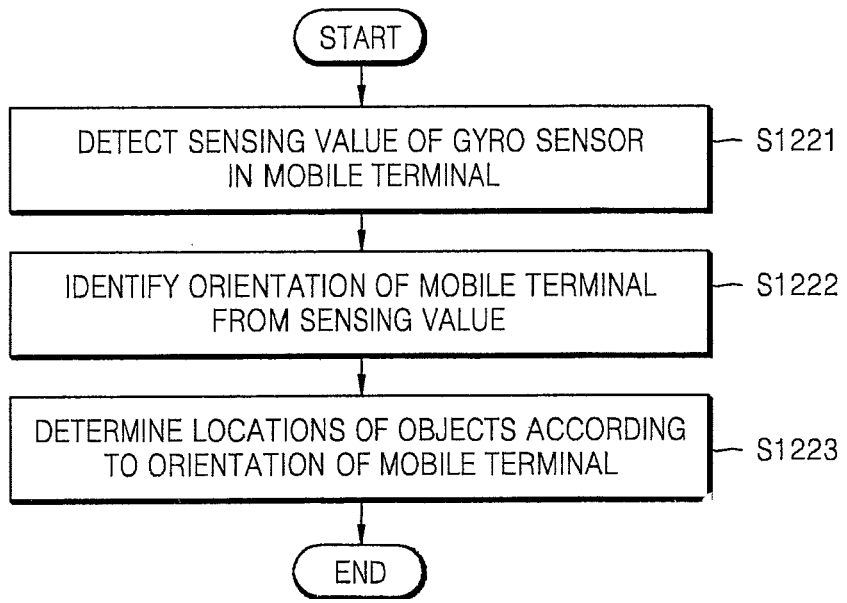
Figure 14:
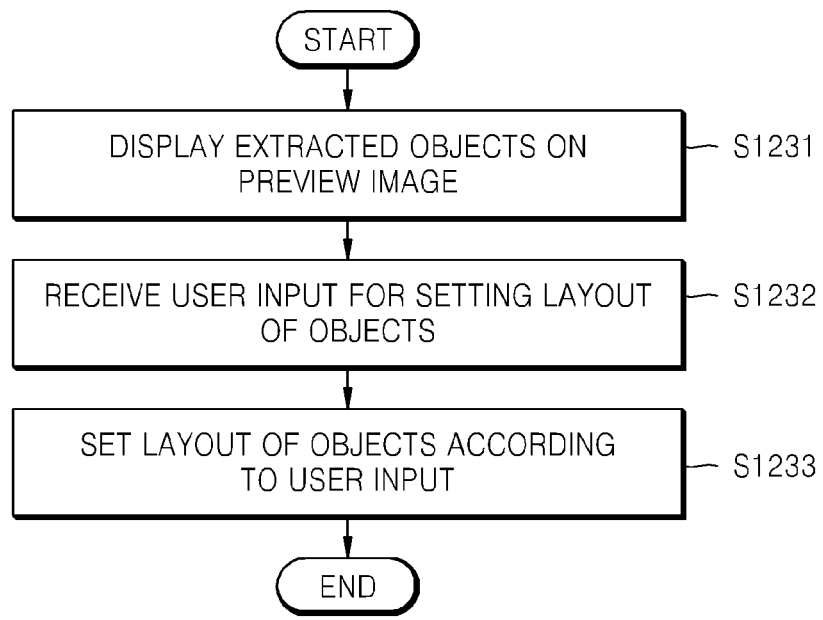

FIGS. 12 through 14 are flowcharts illustrating processes of setting a layout of the objects in a method of printing the web page by using the mobile terminal, according to an embodiment. FIGS. 12 through 14 are flowcharts illustrating processes included in the operation S1200 of FIG. 10.

As illustrated in FIG. 12, printing options are set according to user's input in operation S1211. After setting the printing operations, sizes of the objects are expanded or reduced according to the printing options in operation S1212. For example, the sizes of the objects may be expanded or reduced according to a size of a selected printing medium. The sizes of the objects may be expanded or reduced by changing the attribute-values of the objects.

When the sizes of the objects are determined in operation S1212, locations of the objects are determined according to the printing options in operation S1213. The locations of the objects may be changed by changing the values about the relative locations between the objects.

In FIG. 12, the locations of the objects are determined after expanding or reducing the sizes of the objects; however, the above order may be changed or the two processes may be performed at the same time.

As illustrated in FIG. 13, a sensing value of a gyro sensor provided in the mobile terminal is detected in operation S1221, and an orientation of the mobile terminal is identified from the sensing value in operation S1222. That is, it may be determined whether the mobile terminal is placed in a longitudinal direction or in a transverse direction. After identifying the orientation of the mobile terminal, the locations of the objects maybe determined according to the orientation direction of the mobile terminal in operation S1223. Therefore, the user may set the printing direction and may change the layout of the objects simply by changing the direction of the mobile terminal.

As illustrated in FIG. 14, the extracted objects are displayed on a preview image of the web page in operation S1231. In operation S1232, an input of setting the layout of the objects is received from the user. For example, the user may change the location of the object by moving his/her finger while contacting the object displayed on the preview image. When receiving the user input, the layout of the objects is set according to the user input in operation S1233. Therefore, the user may freely change the locations of the objects.

Figure 15:
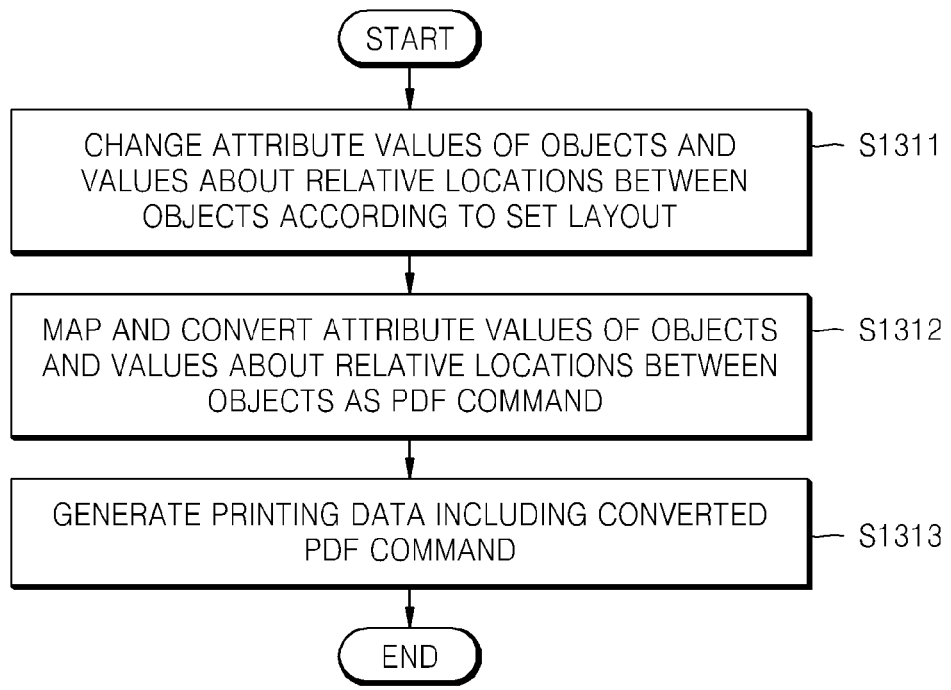
FIGS. 15 and 16 are flowcharts illustrating processes of rendering objects in a method of printing a web page by using a mobile terminal according to an embodiment.
Figure 16:
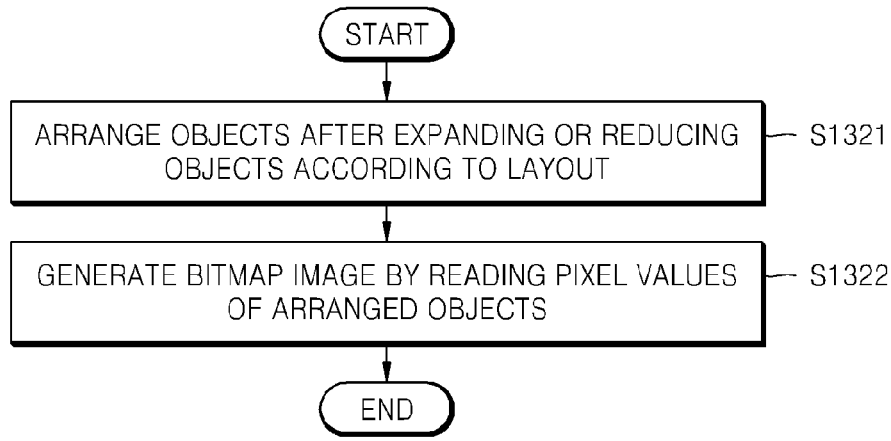

FIGS. 15 and 16 are flowcharts illustrating processes of rendering the objects in a method of printing the web page by using the mobile terminal according to an embodiment. FIGS. 15 and 16 are flowcharts illustrating exemplary processes included in operation S1300 of FIG. 10.

FIG. 15 is a flowchart illustrating processes of performing an object-based rendering operation, and processes of generating printing data of PDF format. As illustrated in FIG. 15, the attribute-values of the objects and the values about the relative locations between the objects are changed according to the layout in operation S1311. The attribute-values of the objects and the values about the relative locations are mapped to a PDF command and converted in operation S1312. In operation S1313, printing data including the converted PDF command is generated.

FIG. 16 is a flowchart illustrating a rendering method for generating a bitmap image. As illustrated in FIG. 16, the objects are arranged after being expanded or reduced according to the layout in operation S1321, and pixel values of the objects are read to generate a bitmap image in operation S1322.

Figure 17:
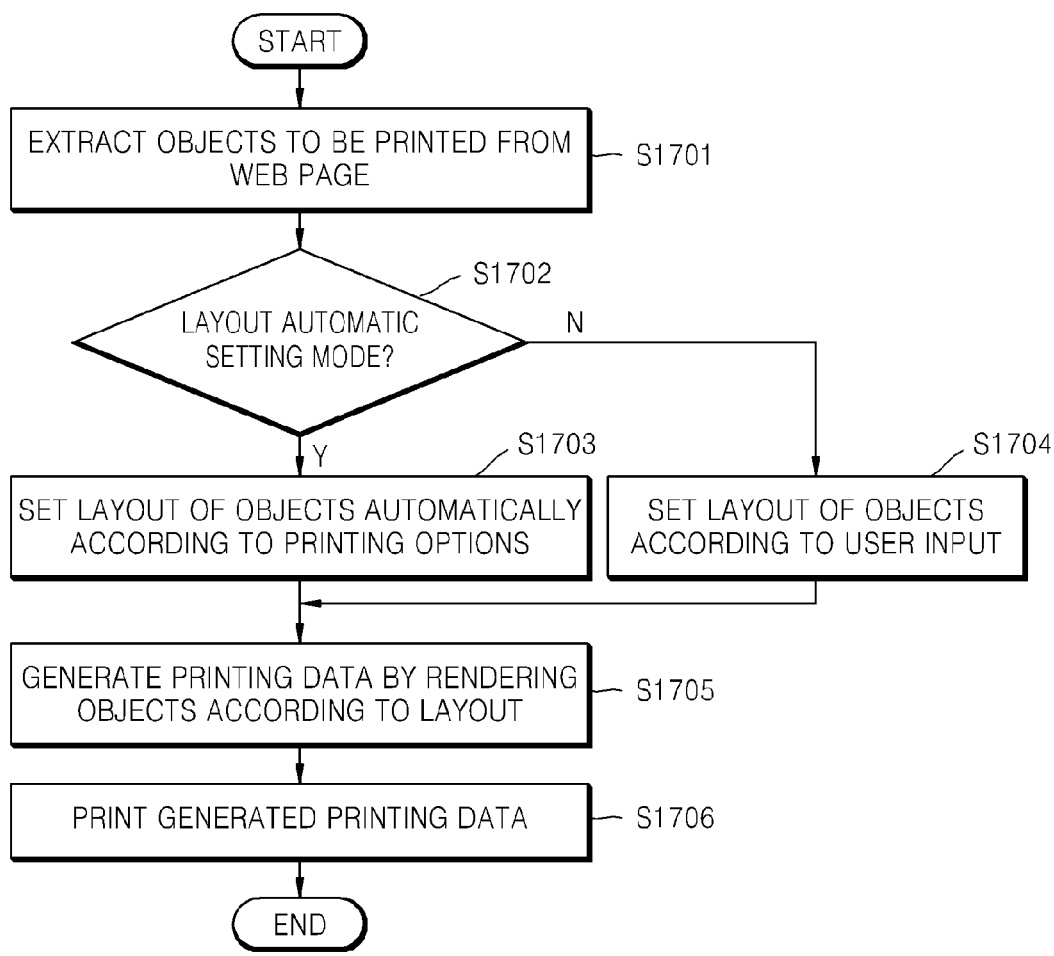
FIGS. 17 through 19 are flowcharts illustrating a method of printing a web page by using a mobile terminal, according to an embodiment.
Figure 18:
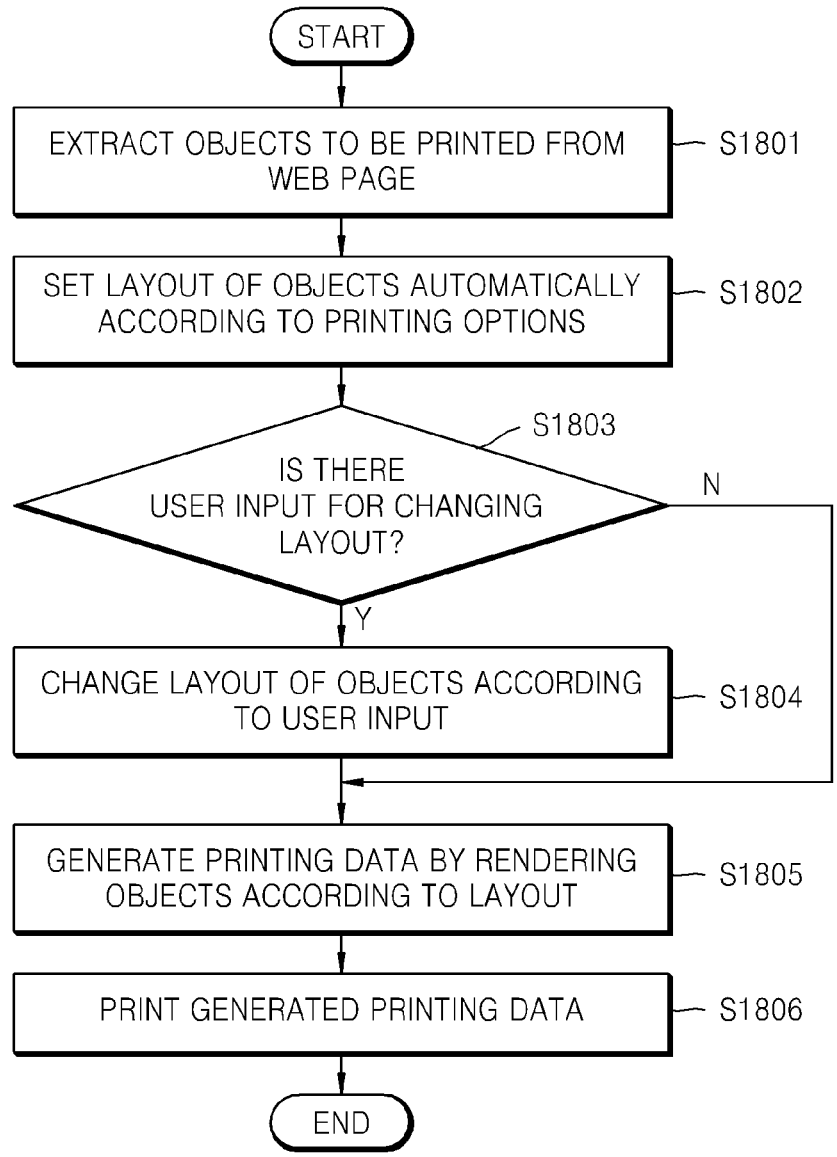
Figure 19:
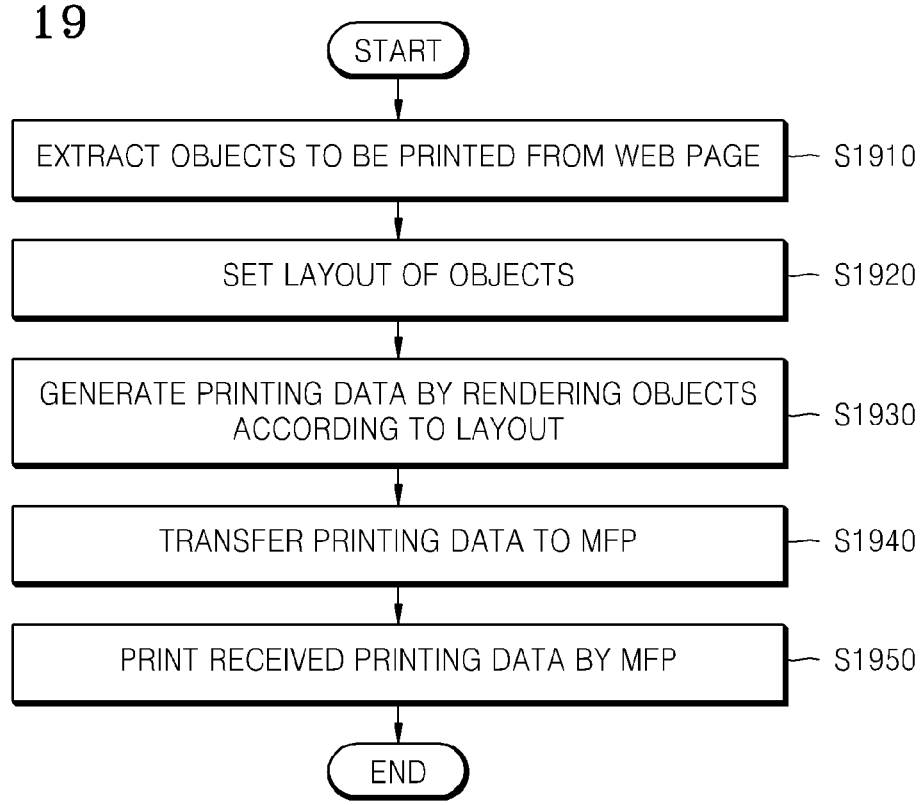

FIGS. 17 through 19 are flowcharts illustrating a method of printing a web page by using a mobile terminal according to an embodiment.

As illustrated in FIG. 17, objects that are to be printed are extracted from a web page in operation S1701. It is determined whether a layout automatic setting mode is turned on in operation S1702. If the layout automatic setting mode is turned on, a layout of the extracted objects is set automatically according to printing options in operation S1703. However, if the layout automatic setting mode is turned off, a layout of the extracted objects is set according to a user input in operation S1704.

The extracted objects are rendered according to the layout to generate printing data in operation S1705, and the generated printing data is transferred to an MFP so that the MFP may print the printing data in operation S1706.

As illustrated in FIG. 18, objects that are to be printed are extracted from a web page in operation S1801. A layout of the extracted objects is automatically set by printing options in operation S1802. The printing options may be set by user input. In operation S1803, it is determined whether there is a user input for changing the layout. If there is the user input for changing the layout, the layout of the extracted objects is changed according to the user input in operation S1804. If there is no user input for changing the layout, the process goes to operation S1805.

In operation S1805, the extracted objects are rendered according to the layout to generate printing data. In operation S1806, the printing data is transferred to an MFP, and the MFP prints the printing data.

As illustrated in FIG. 19, objects that are to be printed are extracted from a web page in operation S1910. In operation S1920, a layout of the extracted objects is set. In addition, in operation S1930, the extracted objects are rendered according to the layout to generate printing data.

When the printing data is generated, the mobile terminal transfers the printing data to an MFP in operation S1940. The MFP receives the printing data and prints the printing data in operation S1950. Detailed processes of operation S1950 for printing the printing data are illustrated in a flowchart of FIG. 20.

Figure 20:
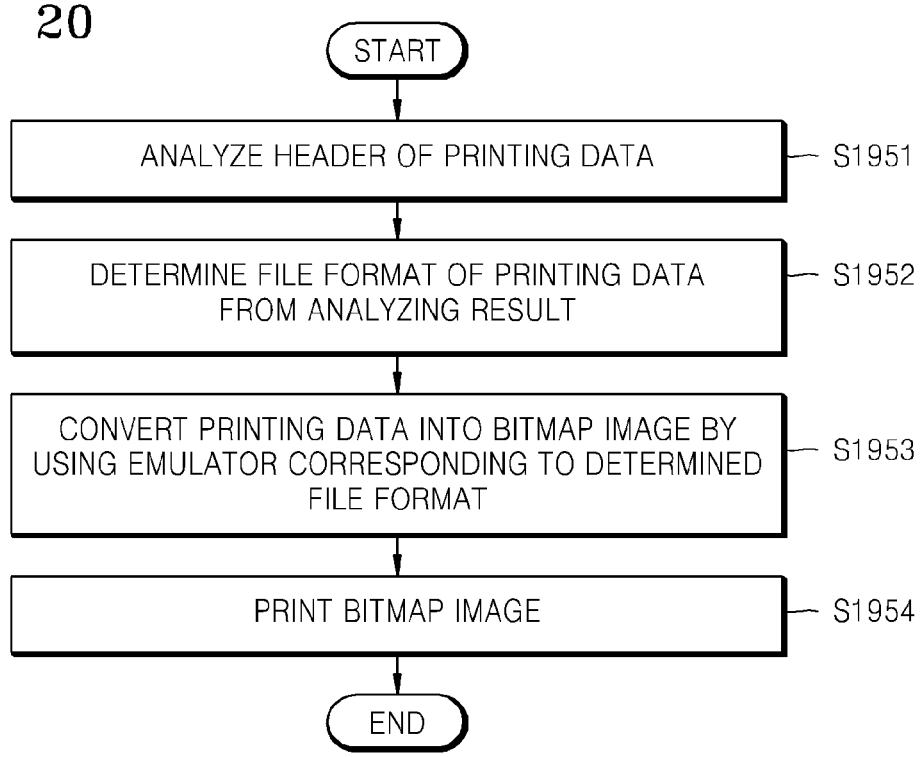
FIG. 20 is a flowchart illustrating processes of printing data transmitted from an image forming apparatus in a method of printing the web page by using a mobile terminal according to an embodiment.

FIG. 20 is a flowchart illustrating processes of printing the printing data by the MFP in the method of printing the web page by using the mobile terminal according to an embodiment. As illustrated in FIG. 20, in operation S1951, a header of the printing data transferred from the mobile terminal is analyzed. In operation S1952, a file format of the printing data is determined according to a result of analyzing the header. In operation S1953, the printing data is converted into a bitmap image by using an emulator corresponding to the file format determined in operation S1952. To do this, the MFP includes emulators corresponding to formats such as PCL, PDF, XPS, and PS. In operation S1954, the MFP prints the bitmap image.

According to the one or more of the above embodiments, the objects to be printed are extracted from the web page displayed on the mobile terminal and printed, and accordingly, vector graphics, texts, and the like included in the web page may be printed with high quality. A time for generating the printing data may be reduced, and a limitation in hardware specifications for performing the printing operation may be lowered, thereby providing excellent printing performance.

Moreover, the user may freely change the layout of the web page to perform the printing operation with optimal layout, and even when the printing options are changed, the layout may be automatically changed according to the printing options.

The method may be formed as a common module that may be used in different kinds of platforms, and thus, a time for developing a printing program for each operating system (OS) of the mobile terminal may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope the present invention as defined by the claims.

What is claimed is:

1. A method of printing a web page by using a mobile terminal and an image forming apparatus, the method comprising:
   displaying the web page on the mobile terminal;
   extracting objects to be printed from the web page displayed on the mobile terminal directly from the web page;
   setting a layout of the extracted objects;
   generating printing data directly from the extracted objects by rendering the objects according to the set layout and directly converting the extracted objects to printing data;
   transferring the generated printing data to the image forming apparatus; and
   parsing and printing the transferred printing data by using the image forming apparatus,
   wherein the extracting objects to be printed from the web page displayed on the mobile terminal directly from the web page includes:
      obtaining web page sources by analyzing the displayed web page,
      deleting a configuration of the web sources that are not displayed on the displayed web page including at least one of a sound configuration, an event configuration, and a background logic configuration from among items included in the web page sources, and
      extracting attribute-values of the objects and values about at least one relative location between a first of the objects and a second of the objects from the obtained web page sources,
   wherein the layout is allowed to be changed by a user, and
   wherein the printing of the transferred printing data by using the image forming apparatus comprises:
      identifying a file format of the transferred printing data by analyzing a header of the transferred printing data,
      converting the transferred printing data into a bitmap image by using an emulator corresponding to the file format, and
      printing the bitmap image.

2. The method of claim 1, wherein the setting of the layout comprises adjusting sizes and locations of the objects by changing the attribute-values of the objects and the values about the relative locations between the objects.

3. The method of claim 1, wherein the generating of the printing data comprises mapping and converting the attribute-values of the objects and the values about the relative locations between the objects as a command corresponding to a format of the printing data that is to be generated.

4. The method of claim 1, wherein the extracting of the objects comprises extracting some or all of the objects visible on a screen of the mobile terminal, except for invisible objects on the screen, from among the objects included in the web page.

5. The method of claim 1, wherein the setting of the layout comprises:
identifying set printing options; and
determining sizes and locations of the objects according to the printing options.

6. The method of claim 1, wherein the setting of the layout comprises:
detecting a sensing value of a gyro sensor provided in the mobile terminal;
identifying an orientation of the mobile terminal according to the detecting sensing value; and
determining the sizes and locations of the objects according to the orientation of the mobile terminal.

7. The method of claim 1, wherein the setting of the layout comprises:
receiving a user input regarding the layout setting; and
changing the sizes and locations of the objects according to the user input.

8. The method of claim 1, wherein the generating of the printing data comprises generating a bitmap image by reading pixel values of the objects that are arranged according to the layout.

9. The method of claim 1, wherein the objects to be printed may be automatically selected and extracted according to a characteristic of the web page.

10. A non-transitory computer-readable recording medium having embodied thereon a program for executing a method for printing a web page by using a mobile terminal and an image forming apparatus, the method comprising:
displaying the web page on the mobile terminal;
extracting objects to be printed from the web page displayed on the mobile terminal directly from the web page;
setting a layout of the extracted objects;
generating printing data directly from the extracted objects by rendering the objects according to the set layout and directly converting the extracted objects to printing data;
transferring the generated printing data to the image forming apparatus; and
parsing and printing the transferred printing data by using the image forming apparatus,
wherein the extracting objects to be printed from the web page displayed on the mobile terminal directly from the web page includes:
obtaining web page sources by analyzing the displayed web page,
deleting a configuration of the web sources that are not displayed on the displayed web page including at least one of a sound configuration, an event configuration, and a background logic configuration from among items included in the web page sources, and
extracting attribute-values of the objects and values about at least one relative location between a first of the objects and a second of the objects from the obtained web page sources,
wherein the layout is allowed to be changed by a user, and
wherein the printing of the transferred printing data by using the image forming apparatus comprises:
identifying a file format of the transferred printing data by analyzing a header of the transferred printing data,
converting the transferred printing data into a bitmap image by using an emulator corresponding to the file format, and
printing the bitmap image.

11. A system including an image forming apparatus and a mobile terminal, the mobile terminal comprising:
a user interface to receive a user input;
a communicator configured to receive a web page;
a display configured to display the web page;
at least one memory storing instructions;
a controller including at least one processor that executes the instructions stored in the at least one memory to:
generate printing data about the web page displayed on the display, the controller generating the printing data directly from extracted objects by configuring items of the web page displayed on the display as objects and directly converting the extracted objects to printing data,
transfer the generated printing data to the image forming apparatus; and
parse and print the transferred printing data by using the image forming apparatus, extract objects to be printed from the web page displayed on the display directly from the web page,
delete a configuration of the web sources that are not displayed on the displayed web page including at least one of a sound configuration, an event configuration, and a background logic configuration from among items included in the web page sources, and
extract attribute-values of the objects and values about at least one relative location between a first of the objects and a second of the objects from obtained web page sources by analyzing the web page displayed on the display,
wherein the printing of the transferred printing data by using the image forming apparatus comprises:
identifying a file format of the transferred printing data by analyzing a header of the transferred printing data,
converting the transferred printing data into a bitmap image by using an emulator corresponding to the file format, and
printing the bitmap image.

12. The system of claim 11, wherein the controller further configured to:
set a layout of the objects, and
perform a rendering operation according to the layout to generate the printing data, wherein the layout is allowed to be changed by a user.

13. The system of claim 12, wherein the controller adjusts sizes and locations of the objects by changing the attribute-values of the objects and the values about the relative locations between the objects.

14. The system of claim 12, wherein the controller maps and converts the attribute-values of the objects and the values about the relative locations between the objects as a command corresponding to a format of the printing data that is to be generated.

15. The system of claim 12, wherein the controller extracts some or all of the objects visible on a screen of the mobile terminal, except for invisible objects on the screen, from among the objects included in the web page displayed on the display.

16. The system of claim 12, wherein the controller identifies printing options, and determines the sizes and locations of the objects according to the printing options.

17. The system of claim 12, wherein when a user input about the layout is received through the user interface, the controller changes the sizes and locations of the objects according to the user input.

18. The system of claim 12, wherein the controller generates a bitmap image by reading pixel values of the objects arranged according to the layout set by the controller.

19. The system of claim 11, wherein the objects to be printed may be automatically selected and extracted according to a characteristic of the web page.

20. A method of printing, the method comprising:
 displaying a page;
 extracting objects to be printed from the page displayed directly from the page;
 setting a layout of the extracted objects;
 generating printing data directly from the extracted objects by rendering the objects according to the set layout and directly converting the extracted objects to printing data;
 transferring the generated printing data to an image forming apparatus; and
 parsing and printing the transferred printing data by using the image forming apparatus,
 wherein the extracting objects to be printed from the page displayed directly from the page includes:
  obtaining page sources by analyzing the displayed page,
  deleting a configuration of the web sources that are not displayed on the displayed web page including at least one of a sound configuration, an event configuration, and a background logic configuration from among items included in the web page sources, and
  extracting attribute-values of the objects and values about at least one relative location between a first of the objects and a second of the objects from the obtained page sources,
 wherein the layout is allowed to be changed by the user, and
 wherein the printing of the transferred printing data by using the image forming apparatus comprises:
  identifying a file format of the transferred printing data by analyzing a header of the transferred printing data,
  converting the transferred printing data into a bitmap image by using an emulator corresponding to the file format, and
  printing the bitmap image.

* * * * *